United States Patent [19]
Rankin et al.

[11] Patent Number: 5,613,071
[45] Date of Patent: Mar. 18, 1997

[54] METHOD AND APPARATUS FOR PROVIDING REMOTE MEMORY ACCESS IN A DISTRIBUTED MEMORY MULTIPROCESSOR SYSTEM

[75] Inventors: Linda J. Rankin, Beaverton; Joseph Bonasera, Portland; Nitin Y. Borkar, Beaverton; Linda C. Ernst, Portland; Suvansh K. Kapur, Beaverton; Daniel A. Manseau, Portland; Frank Verhoorn, Beaverton, all of Oreg.

[73] Assignee: Intel Corporation, Santa Clara, Calif.

[21] Appl. No.: 502,071

[22] Filed: Jul. 14, 1995

[51] Int. Cl.$^6$ .................................................. G06F 12/02
[52] U.S. Cl. .................... 395/200.16; 364/252.6; 364/230.6; 364/240.8; 364/DIG. 1; 395/421.11
[58] Field of Search ....................... 395/800, 412, 395/421.1, 421.11, 200.16, 200.2, 410

[56] References Cited

U.S. PATENT DOCUMENTS

| | | | |
|---|---|---|---|
| 5,235,595 | 8/1993 | O'Dowd | 370/94.1 |
| 5,282,201 | 1/1994 | Frank | 370/94.1 |
| 5,293,500 | 3/1994 | Ishida | 395/375 |
| 5,361,256 | 11/1994 | Doeringer | 370/60 |
| 5,410,654 | 4/1995 | Foster | 395/375 |
| 5,459,867 | 10/1995 | Adams | 395/828 |
| 5,473,608 | 12/1995 | Gagne | 370/85.13 |
| 5,491,693 | 2/1996 | Britton | 370/85.13 |
| 5,555,244 | 9/1996 | Gupta | 370/60.1 |

*Primary Examiner*—Eric Coleman
*Attorney, Agent, or Firm*—Blakely, Sokoloff, Taylor & Zafman

[57] ABSTRACT

A massively parallel data processing system is disclosed. This data processing system includes a plurality of nodes, with each node having at least one processor, a memory for storing data, a processor bus that couples the processor to the memory, and a remote memory access controller coupled to the processor bus. The remote memory access controller detects and queues processor requests for remote memory, processes and packages the processor requests into request packets, forwards the request packets to the network through a router that corresponds to that node, receives and queues request packets received from the network, recovers the memory request from the request packet, manipulates local memory in accordance with the request, generates an appropriate response packet acceptable to the network and forwards the response packet to the requesting node.

12 Claims, 7 Drawing Sheets

Global Address to Remote Physical Address Translation

METHOD AND APPARATUS FOR PROVIDING REMOTE MEMORY ACCESS IN A DISTRIBUTED MEMORY MULTIPROCESSOR SYSTEM

BACKGROUND OF THE INVENTION

1. Field of the Invention

The present invention relates to the field of remote memory access, and in particular to a method and apparatus for providing remote memory access in distributed memory multiprocessor systems.

2. Description of the Related Art

Figure 1:
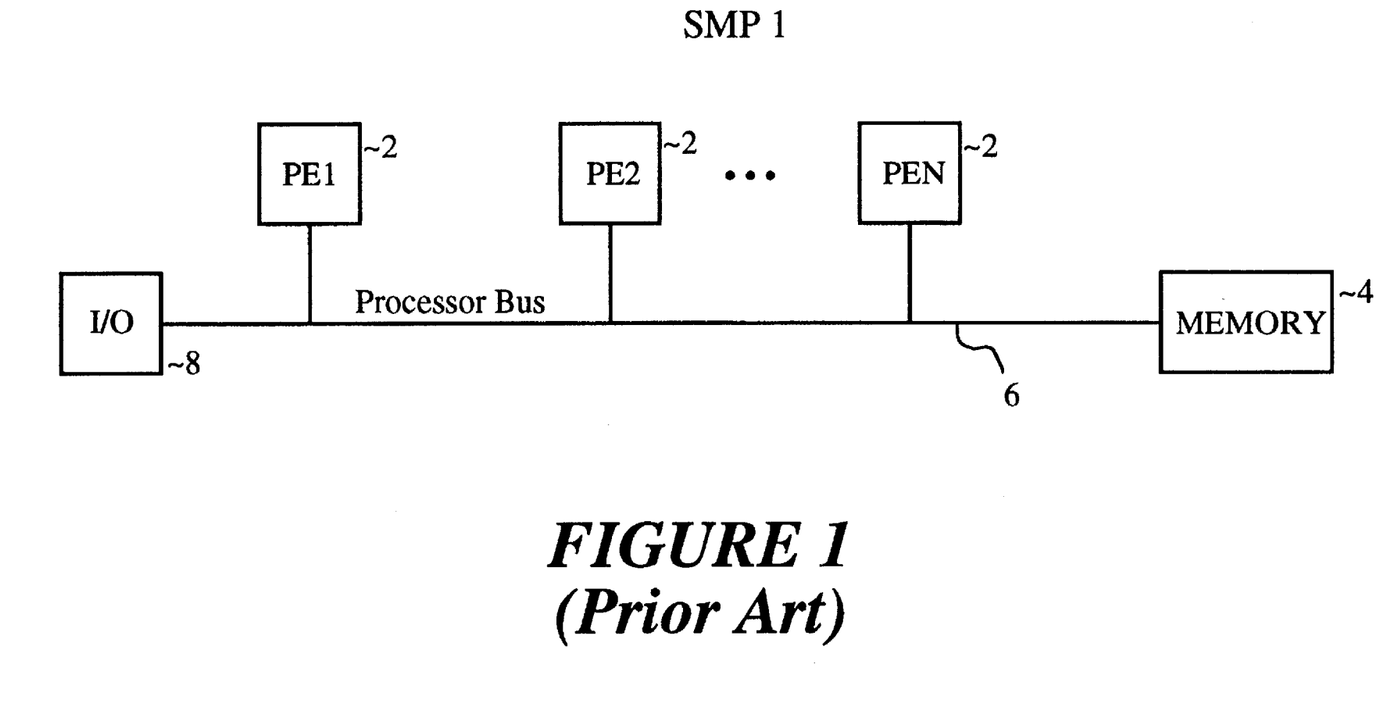
FIG. 1 illustrates in block diagram fashion a symmetric multiprocessing system (SMP)

FIG. 1 illustrates a prior art multi-processing system. In symmetric multi-processing systems (SMP) 1 there are a plurality of processor elements 2 coupled together by a processor bus 6. The processor elements 2 are coupled to I/O devices 8 through the processor bus, and also to memory 4 through the processor bus 6. Processor elements 2 PE1, PE2 ... PEn share memory 4. In SMP systems based on a shared bus 6, the issues of memory consistency and cache coherency are usually addressed by the protocol of the shared bus.

Figure 2:
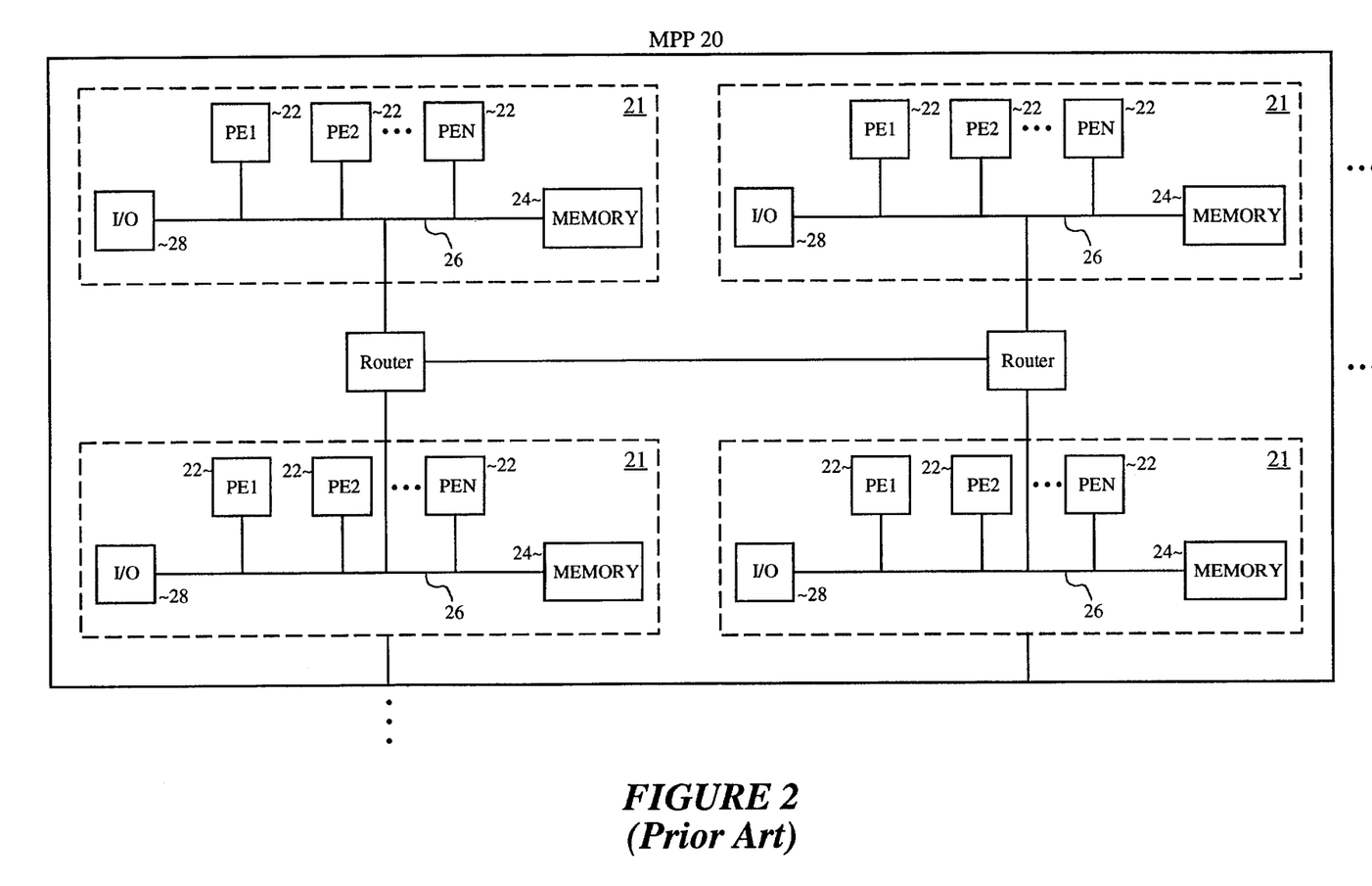
FIG. 2 illustrates in block diagram fashion a massively multiprocessing system (MPP)

FIG. 2 illustrates another prior art multi-processing system. In massively parallel processing systems (MPP) 20, there are a plurality of nodes connected by a network. A node comprises of a plurality of processor elements 22 coupled to I/O 28 and memory 24 through a processor bus 26. Nodes 21 are connected to each other within the network through a number of routers 28. In MPP large scale systems, processing nodes 21 are connected using a high speed network.

In these networks, a "message passing" programming model and style is used. This programming model is different and distinct from the "shared memory" style of programming used in shared bus design of SMP systems.

A major drawback of the "message passing" programming model is that for each access to a remote node, the amount of data shared must be large enough to justify the overhead (i.e., resources used). For example, fine-grain sharing (i.e., transfer of double words or smaller blocks of information) between nodes is inefficient and wastes system resources. Thus, there is a need for a remote memory access architecture that is scalable to support MPP large scale systems and also facilitates fine-grain sharing of memory without wasting computer resources.

SUMMARY OF THE INVENTION

A method and apparatus for remote memory access in multiprocessor systems are provided. The present invention allows for building MPP systems consisting of many nodes while still maintaining a shared memory style of programing used in SMP systems. The remote memory access (RMA) architecture of the present invention allows users to directly access memory on remote nodes. This invention supports the sharing of pages of memory between cooperating processors that reside on multiple nodes in a multi-processor computer system. Once a page is mapped into a processor's address space, access to remote memory locations (i.e., memory on another node) can be accomplished with direct load and store commands.

The remote memory access (RMA) architecture is particularly useful and efficient for fine-grain sharing between several cooperating processes. In other words, data transfers of double word and word size are justifiable because the overhead associated with a RMA architecture is small compared to a "message passing" programming style.

The remote memory access architecture includes the following key elements:

- a mapping of physical memory into two regions (local and global);
- hardware support to enable remote bus emulation in the network;
- a network interface and remote memory protocol based on requests and responses;
- hardware support for user managed memory fences; and
- hardware support for atomic operations (i.e., read and clear operations) on shared data to assist user-managed synchronization.

BRIEF DESCRIPTION OF THE DRAWINGS

The objects, features and advantages of the present invention will be apparent to one skilled in the art in light of the following detailed description in which:

FIG. 4A & 4B illustrates the components/elements of a remote memory access architecture within a remote memory access controller.

DETAILED DESCRIPTION OF THE INVENTION

The present invention provides a method and apparatus for remote memory access (RMA) in distributed memory multiprocessor computer systems. In particular, the present invention provides a Network Interface Component (NIC) or remote memory access (RMA) controller for a MPP system. For purposes of explanation, specific details are set forth to provide a thorough understanding of the present invention. However, it will be understood by one skilled in the art, from reading this disclosure, that the invention may be practiced without these details. Moreover, well-known elements, devices, process steps and the like are not set forth in order to avoid obscuring the invention.

DEFINITIONS

Atomic Operation Memory (AOM)

A region of local memory where a Read from a remote node initiates an atomic Read & Clear sequence on the local node.

Local (node/processor/remote memory access controller):

The term "local" is used to refer to the node and its components where the remote memory access request originates. A remote access is caused by an application running on the local node processor executing a load or store to an address that maps to a globally accessible address space.

Remote (node/processor/remote memory access controller):

The term "remote" is used to refer to the node and its components where the remote memory access request is serviced. At the remote node, the memory access request arrives on the network and is executed by the remote memory access controller or remote NIC (Network Interface Component).

Request

An RMA request always corresponds to the memory request originated by the processor. At the local node, the local NIC obtains requests from the processor bus. At the remote node, the remote NIC receives the request from the network.

Request Queues

The remote memory access controller (NIC) has both inbound and outbound request queues. These queues are dedicated to RMA request packets. These queues always map to a dedicated network channel.

Response

An RMA response always corresponds to the response from memory received as a result of a RMA request. At the local node, responses are obtained from the network. At the remote node, responses are received by the NIC from the processor bus.

Response Queues

The remote memory access controller has both inbound and outbound response queues. These queues are dedicated to RMA response packets. These queues always map a dedicated network channel separate and distinct the channel used for requests.

Figure 3:
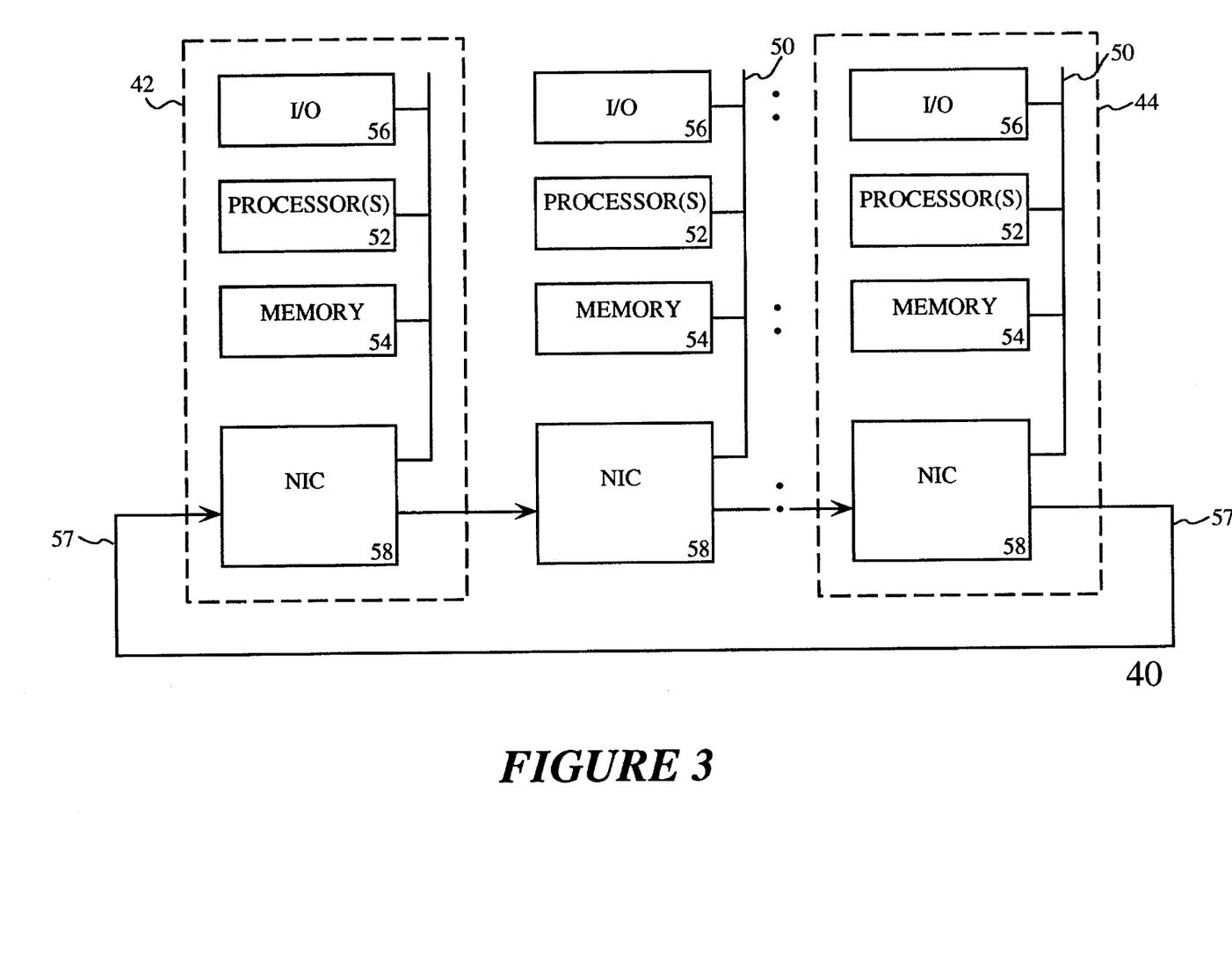
FIG. 3 illustrates in block diagram fashion an embodiment of the present invention.

Referring to FIG. 3, an illustrative embodiment of the present invention, a MPP computer system as a ring, is shown. In this embodiment, the system 40 comprises a plurality of local processor nodes (i.e., 42 and 44). Although these local processor nodes 42, 44 may differ in function, each of these nodes includes a processor 52, associated memory 54 and a NIC 58 as illustrated for a first local processor node 42. Each node may also include an I/O device or devices 56.

The processor(s) 52, memory 54, and input/output devices 56 are coupled to the NIC 58 through a processor bus 50. The processor bus 50 supports split transactions. First, the processor bus 50 allows for multiple outstanding concurrent transactions to be placed on the bus. Second, the processor bus protocol allows for an out-of-order execution of those transactions. For example, whereas a non split transaction bus would require the completion of a first issued transaction before the completion of a later issued transaction, a split transaction bus allows a later issued transaction to complete before a previously-issued instruction. This split transaction bus 50 is particularly advantageous in that it avoids a deadlock situation. Because the processor bus 50 allows for multiple outstanding requests for memory, with responses being returned at some later time, the split transaction bus 50 is integral to designing a deadlock free MPP system with remote memory access.

The processor block 52 represents either one processor or a plurality of processors. Although in the present embodiment, each node can support up to four processors, the number of processors per node may be increased or decreased depending on the design and needs of the MPP system with remote memory access.

Memory block 54 includes main memory that is used to store applications and their corresponding data (i.e., DRAMS). The memory block 54 may also include a cache (i.e., SRAMS) and its associated controller circuitry.

The input/output block 56 may include a number of different peripheral devices. An input/output block 56 may also be a bridge circuitry that connects the processor bus to another bus with a different protocol. Each processor node 42 is connected to the other processor nodes in the network through the NIC 58.

FIG. 3 further illustrates a network, connecting each of the processor nodes where each connection contains at least two dedicated channels 57. The remote memory access architecture requires that one lane in the network be dedicated for requests, and that one lane be dedicated for responses. Further, for deadlock avoidance, the multiprocessor system must guarantee that responses will always be removed from the network. The use of buffers for this purpose will be described in further detail with respect to the network interface component (NIC).

Although FIG. 3 only illustrates three (3) nodes, the remote memory access architecture is flexible and scalable in that it can accommodate many more nodes than shown. The maximum number for this embodiment is 256.

Thus, FIG. 3 illustrates a number of processor nodes connected together through the NIC 58 by a network where each connection has at least two dedicated channels.

Figure 4A:
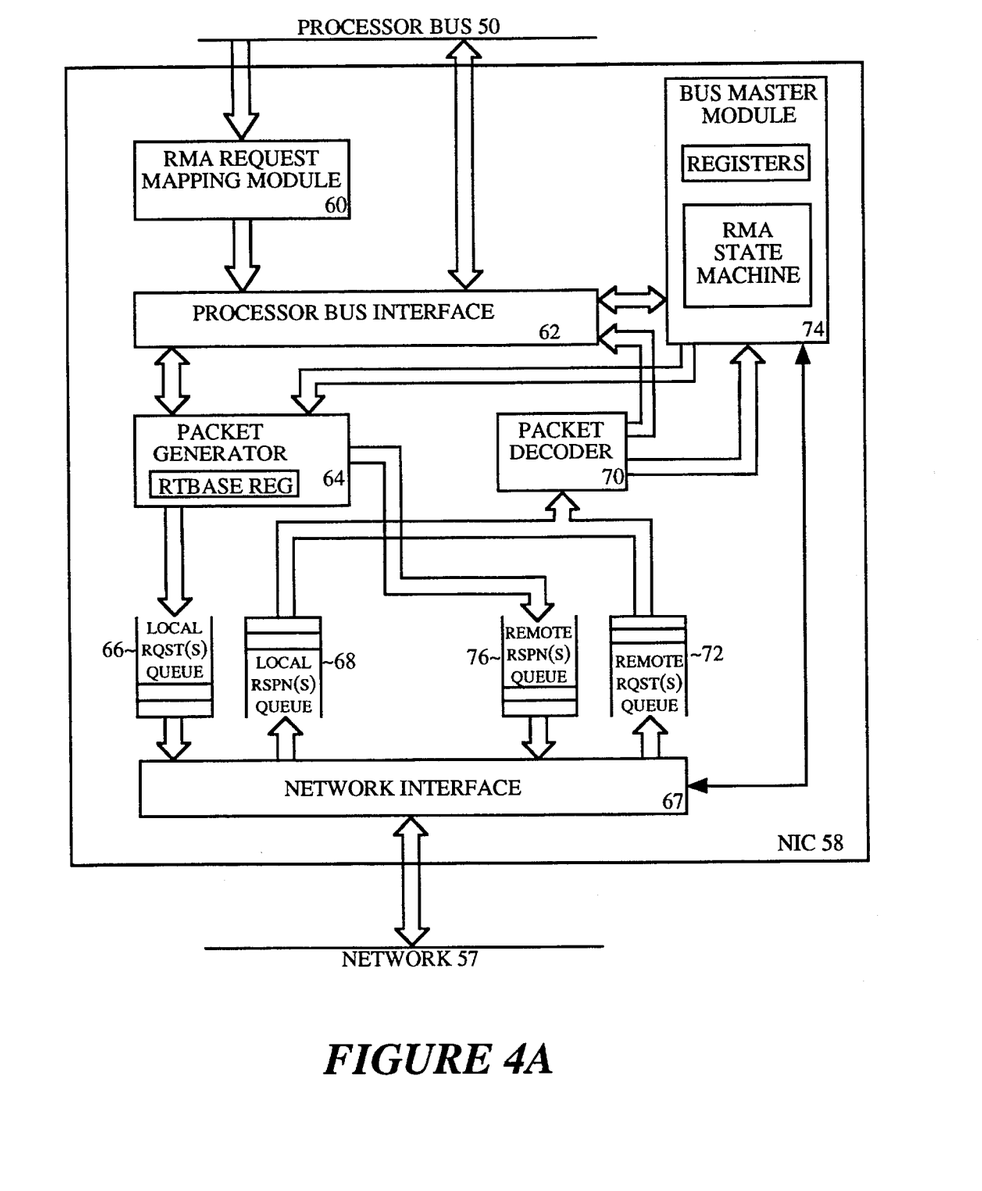
FIG. 4A illustrates in block diagram fashion the network interface component/remote memory access controller of the present invention.

Referring to FIG. 4A, a block diagram of the network interface component 58 is shown. The present invention provides a NIC 58 that is in essence a remote memory access controller having a remote memory access (RMA) request mapping module 60 coupled to a processor bus 50. The RMA request mapping module 60 monitors the processor bus 50 and watches for physical memory addresses that are outside the range of local memory on this node. A physical address outside of the range of this particular node, indicates that the instruction requires a remote memory access request. The RMA request mapping module 60 receives transactions having physical addresses outside the memory range of this node and passes these transactions to the processor bus interface 62.

The processor bus interface 62 facilitates the transfer of transactions from the processor bus 50 into the network interface component 58. The processor bus interface 62 also performs an important function of detecting errors at the processor/NIC interface. Upon detection of an error in an transaction coming from the processor bus 50, processor bus interface 62 disables the processor/NIC interface, which isolates the remote memory access controller 58 from the processor bus 50. If no errors are detected, the transaction is passed from the processor bus interface 62 to the packet generator 64.

The packet generator 64 receives a request and generates a request packet that is suitable for transmission across the network. The size and format of a request packet in one embodiment is described in more detail in a later section. The packet generator 64 uses a route table located in local memory to perform the translation from a request into a request packet. The path with the double sided arrows indicates that the packet generator accesses local memory through processor bus interface 62 to read data from the route table. The packet generator 64 also includes a route table base register (RTBASE), that is used in conjunction with the physical address specified in the instruction to obtain the appropriate data from the route table. A discussion of the route table, its format and the format of a route table base register will be described in further detail in conjunction with Tables 1 and 2.

After a request packet is generated, the request packet is sent to a local request queue 66 that buffers these local request packets before these request packets enter the network. The network interface 67 provides an interface between the NIC 58 and the network. The network interface 67 passes the request packet to the dedicated request packet channel 57. Similarly, the network interface 67 insures that response packet requests are placed into the network into the dedicated response lane. In this embodiment, request packets are placed into a dedicated request packet channel, and request packets are received from the dedicated request packet channel by the network interface 67. Likewise, response packets are placed into and taken from the dedicated response packet channel/lane.

After a remote NIC processes the local request and sends a response packet to the originating NIC, the response packet enters the NIC 58 through the network interface 67. Network interface 67 checks the response packet for any network errors. If an error is found, bus master module 74 disables the network interface 67 so that the response packet with an error will not pass to the processor bus 50. If no errors are detected, the response packet is buffered in the local response queue 68 since the response packet is the result of a local request packet initiated at this node. The response packet is then passed to the packet decoder 70. Packet decoder 70 decodes the response packet and translates it to recover requested data.

If the initial request was a READ transaction, then data from the remote memory is returned. If the request was initially a WRITE instruction, and an acknowledgment that a write completed is returned to the requesting node.

If the response is returning data (initial request was a READ) then it is passed to processor bus interface 62. The response is placed on the processor bus 50, and the READ request is complete. If the response is an acknowledgment, then it is received by the Bus master module 74 only.

Processing of Remote Request:

A request packet originating at another node enters the local NIC 58 from a network lane 57 through network interface 67. As it passes through the network Interface, it is checked for errors. On the condition that no errors are detected, the remote request is then sent to packet decoder 70, which decodes the request packet into its original format (i.e., a request before packetization). The request is then sent to bus master module 74.

The bus master module 74 checks the address specified in the transaction. If the address is in an atomic region, specific steps are taken by the bus master module 74. Atomic operation will be discussed later in this description. Third, the bus master module 74 echoes the original memory request on the processor bus 50. The bus master module 74 sends the original memory request through processor bus interface 62 to processor bus 50.

When data is returned from memory (i.e., in a read from memory), through processor bus interface 62 to the NIC 58, after insuring that there are no errors in the data received from the processor bus 50, the bus master module 74 forwards the response, which contains the desired data, to packet generator 64. The packet generator 64 in turn formulates the response packet that is suitable for the transmission across the network. After the response packet is formulated, it is buffered in the remote response queue 76, where it awaits passage into the network through network interface 67. Subject to an error free packetization process, the response packet is sent to network channel/lane through network interface 67.

Figure 4B:
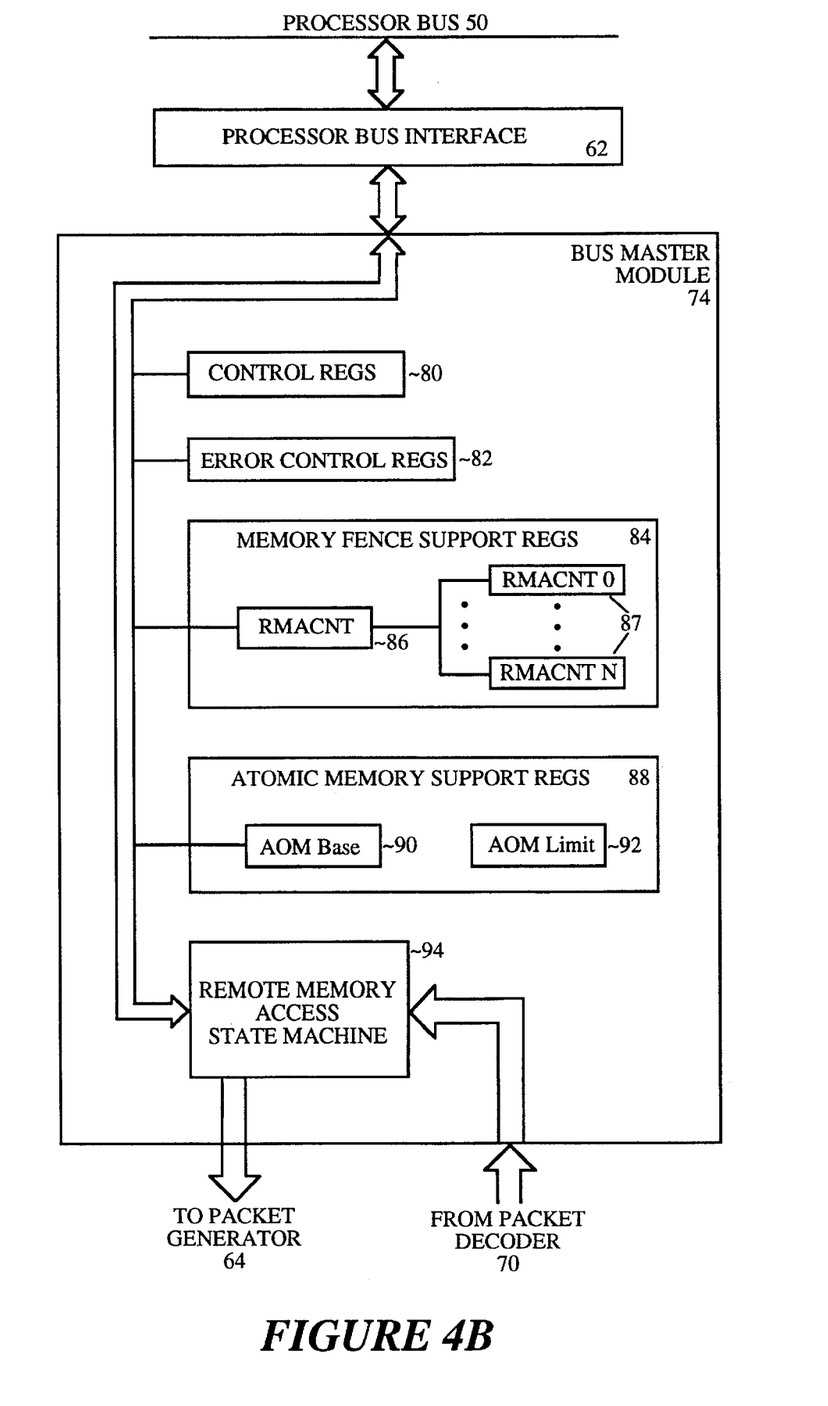
FIG. 4B further illustrates in block diagram fashion the components of a bus master module within the network interface component.

FIG. 4B illustrates in block diagram fashion further details of the bus master module 74. Bus master module 74 includes a plurality of control registers 80, a plurality of error control registers 82, memory fence support registers 84, and atomic memory support registers 88. Moreover, the bus master module 74 includes a remote memory access state machine 94 that implements the RMA protocols described in the specification. As seen in FIG. 4B, each of these registers are visible and accessible to the processors on this particular node through processor bus interface 62 and processor bus 50. A system designer and system programmer may manipulate, (i.e., read and write to) these registers (80, 82, 84, 88).

ATOMIC MEMORY OPERATION

As described earlier with respect to the processing of remote requests, the bus master module 74 checks the address specified in the transaction. The bus master module checks the transaction to determine if the transaction is a READ transaction and to determine if the memory address of the request lies between the contents of the AOM Base register 90 and AOM Limit register 92. If it does, then the READ transaction if forwarded to the processor bus interface 62 as a LOCKed read (using the locked protocol of the processor bus 50). When the data is returned from memory through the processor bus interface 62, the bus master module 74 forwards the response containing the desired data to the packet generator 64.

The Bus Master Module 74 then proceeds to forward a WRITE transaction to the processor bus interface 62. This WRITE transaction uses the same memory address as the previously described read transaction. The value of the data is zero, and the LOCKed bit is cleared.

The above sequence effectively performs a locked read-and-clear operation on the address contained in the remote request.

NETWORK INTERFACE COMPONENT (NIC)

The present invention includes the Network Interface Component (NIC) 58 which in essence is a remote memory access controller. As discussed previously, the NIC 58 includes a first buffer 66, a second buffer 68, a third buffer 76, a fourth buffer 72, a bus master module 74 embodying the RMA protocol, RMACNT[N:0] registers 87, a RMACNT register 86, error control registers 82, and control registers 80. Each of these components will be described in further detail in this section.

NIC BUFFERS

The NIC 58 includes four buffers that buffer the RMA requests and responses. Two buffers 66, 68 are dedicated to local service, which buffers those requests by local processors and their corresponding responses. Two buffers 72, 76 are likewise dedicated to remote service, which buffers those requests from remote nodes and their corresponding responses. The NIC 58 governs both the local service and the remote service of RMA requests.

Buffer 76 queues the responses by this local node which are to be sent back to an originating remote node. Buffer 72 queues the requests from other nodes wishing to access memory on this node. Buffer 66 queues those requests by local processors for memory at a remote node. Buffer 68 queues those responses from remote nodes that were requested by the local processors.

BUS MASTER MODULE

The NIC 58 implements Remote bus emulation in the bus master module 74. Specifically, the bus master module 74 provides a RMA state machine 94 for implementing Remote Memory Access. The principles of RMA can be summarized in the following steps.

First, a memory read request on the processor bus is identified as a remote memory access because the memory address is within the global address space. Second, the remote memory access controller on the local node acknowledges, gets the network route from local memory formulates the request, the request and sends the request to the remote node. At the remote node, the remote memory access controller at the remote node acts as a bus master and asserts the same request on the remote processor bus. The data is transferred on the processor bus. The remote memory access controller on the remote node formulates the response. Next, the remote memory access controller on the remote node sends the response back to the local, originating node. The remote memory access controller on the local node completes the request.

The NIC establishes a RMA protocol based on remote bus emulation that includes three key elements. First, to avoid deadlock on the network, the queues/buffers located on the remote memory access controllers are separate and distinct. For example, the remote memory access controller uses one queue/buffer for requests and one queue/buffer for responses. Second, two packet formats are used: a response packet format and a request packet format. These packets are interpreted by the hardware within the remote memory access controller. Third, all RMA requests receive a response from the remote node.

Specifically, remote memory access requires an interface that can translate processor bus transactions into network transactions, and vice versa. The protocol that is used for transfers can be summarized by the following:

1. For deadlock avoidance, the resources for requests and response are separate and distinct. All requests are mapped to separate network channels. Separate Inbound and Outbound queues are reserved for requests and responses as well. These queues hold the RMA packets as they are being translated to and from the processor bus protocol.
2. Two packet formats are used; a request format and a response format. The information in these packets is interpreted by hardware.
3. All information associated with a request or response is contained in the packet. The NIC maintains a count of outstanding RMA transactions per processor. Other than the count, no information or state is maintained in the NIC for RMA transactions that are outstanding in the network.
2. All RMA requests that complete without error receive a response from the remote node. When a response is received, the outstanding RMA count is decremented.

Packet Definition

Furthermore, the format of the request and response packet may be defined in the following manner. The format of the Request Packet may be as follows:

```
struct Req_Pkt {
    Mesg_Hdr hdr     :25;    // route and RMA identifier
    Mesg_Hdr rtn     :25;    // return route and RMA identifier
    int      base    : 8;    // remote base physical address
    void             : ;     // alignment to 64-bit boundary
    int      defid   : 8;    // requestor's deferred response ID
    int      address :20;    // remote physical address
    int      byte    : 8;    // byte enables
    int      cmd     : 7;    // bus command
    int      stamp   : 4;    // RMA stamp identifier
```

```
    void     unused  : ;     // alignment to 64-bit boundary
    int      data[0:3] :64;  // data IF a write request
    int      CRC     :64;    // CRC} ;
```

For read requests, no data is allocated in the Request Packet. For write requests of one to eight bytes, one data entry is required. For write requests of cache lines, 4 data entries are needed. Note that the return route is sent with the request; he remote node obtains return route information directly from the request packet.

The format of the Response packet may be as follows:

```
struct Resp_pkt {
    Mesg_Hdr hdr     :25;    // route and RMA identifier
    int      defid   : 8;    // requestor's deferred response ID
    int      byte    : 8;    // bytes enabled
    int      cmd     : 7;    // bus command
    int      stamp   : 4;    // RMA stamp identifier
    int      pktID   : 1;    // response to packet identifier
    void             : ;     // alignment to 64-bit boundary
    int      data[0:3] :64;  // data IF a read response
    int      crc     :64;    // CRC} ;
```

For write responses, no data is allocated. The response is merely an acknowledgment that the request completed successfully. For read responses of one to eight bytes one data entry is required. For cache line reads, four data entries are needed. Cache lines are returned to the processor in the same order that they were obtained from memory at the remote node. This insures that the appropriate ordering (in this case, critical word first) for cache line transfers is maintained.

Although the above format of response and request packets are defined with the specific above-mentioned fields, it should be appreciated that the actual data structure may vary depending on the implementation.

Registers Supporting Memory Fences (RMACNT)

For performance, the remote memory access controller 58 posts Writes. In other words, Write requests to memory by the local processor are immediately acknowledged as completed. However, the Write may not have yet occurred and the data to be written is instead queued in a buffer or is in-flight on the network. Posting Writes increases performance of the system because the processor requesting the Write is not required to wait until the actual Write to memory before attending to its next task. The remote memory access architecture allows multiple outstanding requests that may be completed in any order. Although increasing performance, these outstanding requests require software support to manage data consistency.

A user can perform memory fences in his/her program to ensure that outstanding requests have been completed and data consistency is maintained. The remote memory access architecture provides registers that track the number of outstanding remote accesses per processor. These registers are accessible to the system programmer and/or user.

A place in an application where all previous memory accesses must complete before any additional memory accesses can proceed is called memory fence. Memory fences are needed to perform important operations such as (1) synchronization, (2) lock acquisition and (3) release, and even (4) context switches. The NIC provides support for memory fences.

Referring to FIG. 4B, the NIC maintains a 6-bit counter 87 for each symmetric bus agent (RMACNT[3:0]) that contains the number of outstanding RMA requests (both Reads and Writes). Each register can be addressed individually for debug purposes, and all four registers are mapped to a "pseudo" register (RMACNT) 86. When processor_0 reads register RMACNT 86, the contents of RMACNT0 is returned. When processor_1 reads RMACNT 86, the contents of RMACNT1 is returned, and so on. As a result, for a multiple processor node an application running on a particular processor does not need to determine on which processor it resides in order to perform a memory fence.

In summary, the bus master module 74 specifically provides a plurality of registers to memory fence support registers 84: RMACNT 86, RMACNT[3:0]87. RMACNT [3:0]87 are Read/Write registers that contain the count of outstanding accesses per processor. These registers are mainly used by the operating system for querying the status of a node, debugging purposes, and error recovery. RMACNT 86 is a Read-only register. When a user accesses RMACNT 86, the value of RMACNT[n] is returned, where n is the processor on which the user's application is running.

In this embodiment, 63 outstanding requests can be supported per processor. The NIC will assert a RETRY signal to the application during the response phase of any additional remote memory requests when any of the RMACNT[n] counters reach their limit.

RESET & CONTROL REGISTERS

Referring to FIG. 4B, the NIC provides the following registers 80 for software reset and control of RMA transactions and the contents of the Remote memory controller: RMAEN, RMARST#, RMASTMP and RMACTL.

RMAEN (RMAEnable—read/write)

This register enables the NIC RMAprocessor interface. When cleared, transactions on the processor bus that map to the global address space are ignored. Requests and responses may be received from the network, but if they require use of the processor bus, they will remain queued in the NIC. This register is cleared by hardware at reset, bus initialization, and when processor bus errors are detected during RMA bus transactions.

RMARST# (resetRMA#—read/write)

When deasserted, all RMA state is reset. No new requests or responses are accepted from the network and outbound packets are dropped. However, inbound queues are not flushed. This bit must be asserted before RMA can be enabled.

RMASTMP (RMAStamp—read/write)

A 4-bit register that is used to "stamp" RMA requests. The stamp value of responses is compared to the contents of this register. An error is recorded in RMAERR if they do not match. This will be discussed in more detail. At reset, the contents of this register is "0".

RMACTL[1:0] (flushReg, flushResp—read/write)

Writing a "1" to these bits will flush a packet from the inbound request and response queues, respectively. Hardware zeros these locations when flush of the packet is complete.

RMACTL[5:2] (clearTimeOut[3:0]—read/write)

When a "1" is written to these bits, the corresponding RMA TimeOut bits will be cleared in the RMAERR register. Hardware zeros these bits when the operation is complete.

RMACTL[6] (clearBusErr—read/.write)

When a "1" is written to this bit, the corresponding bus error bit will be cleared in the RMAERR register. The bit is cleared by hardware when the operation is complete.

ERROR CONTROL REGISTERS

The NIC 58 has two error domains: network and node. Errors that occur in either domain are not allowed to propagate undetected into the other. This section describes error detection, isolation, notification and recovery support for errors that occur during a remote memory access.

NODE ERRORS

If the error occurs during the assembly of an outgoing packet, the packet is not allowed to enter the network. A BUSERR is recorded in the RMAERR register. Note that no response will be returned to the requesting node if an error occurred while servicing a request received from the network.

NETWORK ERRORS

CRC Errors

Network errors are detected by the NIC 58 through the use of a cyclic redundancy code (CRC) that is appended at the end of each packet. Therefore, if a CRC error is detected at the end of an inbound RMA packet, the packet is stopped at the top of the RMA inbound queue. Two bits are reserved in the RMAERR register, one bit for the inbound request queue and one bit for the response queue.

RMA Time-Out

RMA packets that encounter an error at the remote node, or in the network, will never return a response to the requesting processor. A time-out mechanism is provided by the NIC 58 to detect such errors at the requesting node.

Time-outs are based on inactivity of the RMACNT registers 86, 87 that track the number of outstanding RMA transactions per processor. Since these counters track both RMA reads and writes, a time-out of any RMA transaction can be detected easily when any of the RMA counters is non zero, and the counter has been inactive for t clock cycles (where $n_{to}<=t<2n_{to}$) a timed-out RMA access has occurred. In this embodiment, the timer (RMATMR) is 20-bits, for a time-out in 15–30 milliseconds (in a 66 MHz system). Four bits are reserved in the RMAERR register for recording time-outs, one bit for each bus agent.

Invalid Packet Size

If an error is detected in the packet header while a packet is traversing the network, the CRC for that packet will be corrupted. The NIC is designed so that a packet is not transferred to the node until the CRC is checked. This isolates network errors from the node domain. If a large packet is misrouted to the NIC inbound queues, then it is possible that the packet enters and fills up the RMA queues, with the CRC still in the network. NIC logic records an invalid packet size error in the RMAERR register when a packet reaches the top of the inbound queue, and a CRC has not been encountered.

Invalid Stamp

Due to the nature of the network, it is impossible to flush all outstanding RMA transactions that may pertain to a node from the network. After the NIC has been reset and flushed, a response from an earlier transaction may arrive unexpectedly. The NIC can detect such errors through the use of a 4-bit identifier.

All RMA requests are stamped with a 4-bit identifier (based on the contents of the RMASTMP register). The same stamp value is then returned with the response. The value of the stamp in the response is compared to the contents of the RMASTMP register. If the two stamp values are not equal, the packet is stopped at the top of the inbound response queue and the BADSTMP bit is set in the RMAERR register. The contents of RMASTMP is determined by systems software (i.e., typically changed during error recovery).

ERROR RECORDING AND NOTIFICATION

Referring to FIG. 4B, a plurality of error control register 82 are provided by the NIC 58 for error recording and notification: RMAERR, RMAMSK, and RMABINIT.

RMAERR[3:0] (RMATimeOut per processor—Read only):

A time-out error for processor 0 is recorded in bit RMAERR[0]. For processor 1 an error is recorded by asserting bit RMAERR[1], and so on. Writing to the corresponding clearTimeOut bits in the RMACTL register will clear the error.

RMAERR[5:4] (CRCErr—Read only):

RMAERR[5:4] correspond to CRC error detected in the inbound response queue and the inbound request queue respectively. Writing to the corresponding flushResp/ flushReq in the RMACTL will flush the erroneous packets from the queues and clear the error.

RMAERR[7:6] (BadPkt—Read only):

RMAERR[7:6] correspond to the packet size error detected in the inbound response queue and the inbound request queue, respectively. Writing to the corresponding flushResp/flushReq in the RMACTL will flush the erroneous packets from the queues and clear the error.

RMAERR[8] (BadStmp—Read only)

This bit is asserted when a response packet is received from the network, and the stamp does not match the contents of RMASTMP. Writing to the corresponding flushResp bits in the RMACTL will flush the erroneous response packet from the inbound response queue and clear the error.

RMAERR[9] (BusErr—Read only)

This bit is asserted when a bus error is encountered during an RMA transaction. This error can be cleared by writing to the clearBusErr bit in the RMACTL register.

RMAMSK (RMAErrorMask—Read/Write)

RMAMSK has the same bit format as the RMAERR register described above. The RMAMSK provides software control over the reporting of RMA errors. If an error is recorded in the RMAERR register, and the corresponding bit in the RMAMSK register is asserted, the error will be reflected in a global event register (i.e., be reported to a processor).

RMABINIT (RMABinitMask—Read/Write)

RMABINIT has the same bit format as the RMAERR register described above. The RMABINIT provides software control over the assertion of the BUSINIT signal for RMA errors. If an error is recorded in the RMAERR register, and the corresponding bit in the RMABINIT register is asserted, then the RMC will assert BINIT to initialize the processor bus. This can be used to force a processor to respond to errors in a deadlock situation.

MEMORY MAPPING

Figure 5:
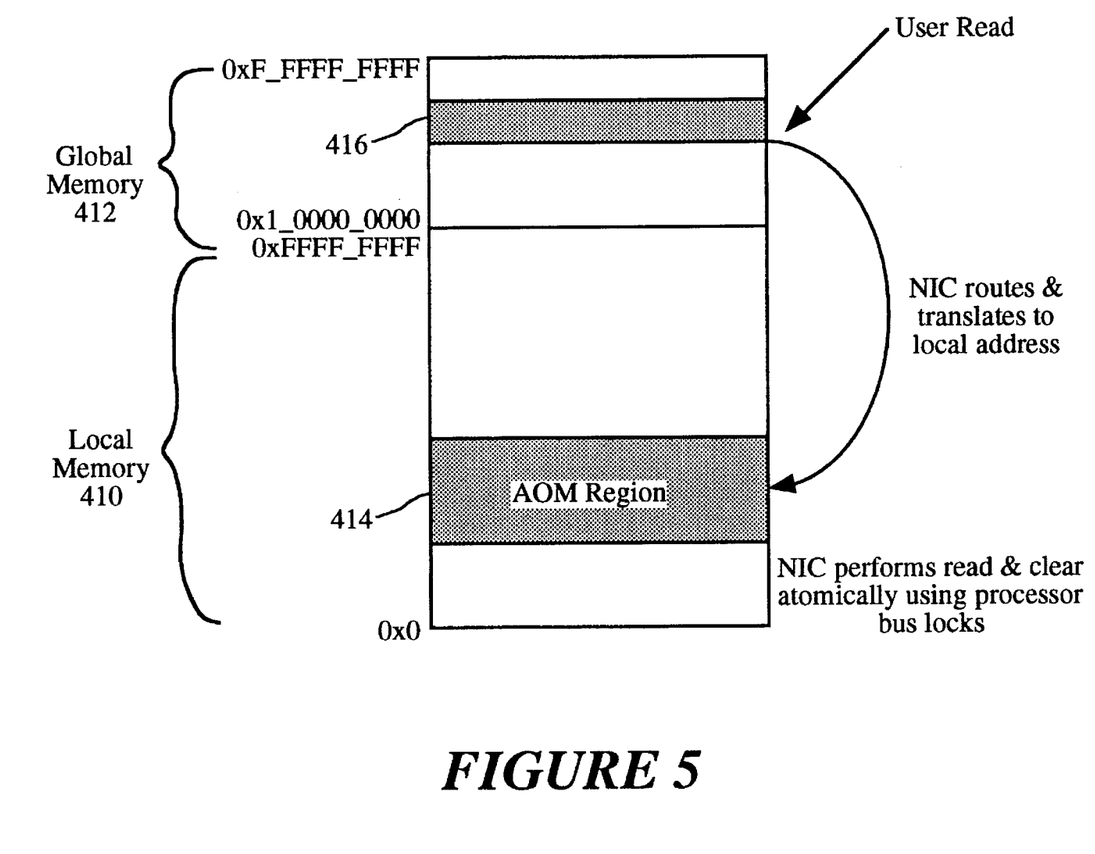
FIG. 5 illustrates translation of a global address to a remote physical address.

In this shared memory multi-processor system, sharing of data between processors on the different nodes occurs through the definition and utilization of global memory addresses that access a global memory space. Referring to FIG. 5, memory addresses are divided into two distinct types: local addresses 410 and global addresses 412. The local addresses point to memory space located in physical memory on that node. Addresses between zero and $2^{32}$ are considered local addresses 410. Addresses above $2^{32}$ are considered global addresses 412.

The global memory space 412 is divided into "N banks" of 16 Mega Bytes each. A node may have one or more banks allocated in physical memory (i. e., DRAMs) that are globally addressable. In other words these specified banks in physical memory are pointed to by global addresses.

As mentioned previously, all memory address are divided into two types: local addresses 410 and global addresses 412. Instructions having an address in the range of global memory addresses are identified by the NIC as remote memory accesses.

A global address at a local node merely points to a physical memory location at a remote node. In this way, each of the processors and processes running on those processors can access not only the physical memory on that local node, but can also potentially access the collective physical memories of all the nodes. In other words, a process views its available memory as the combination of all the physical memory (i.e., DRAMs) on all the nodes.

In one embodiment, the local memory 410 is divided into 256 globally accessible regions of 16 megabytes each, totaling ($2^8 \times 2^{24} = 2^{32}$) four gigabytes of memory on each node. Each node is capable of addressing up to 3840 regions ($2^{12}-2^8$) simultaneously. The NIC uses the high order bits of the physical address to detect a global memory access ($2^{35}-2^{32}$). Once a global memory access is detected, bits $2^{35}-2^{24}$ are used to index into the route table. With this addressing scheme, the route table can hod up to 3840 possible entries.

Figure 6:
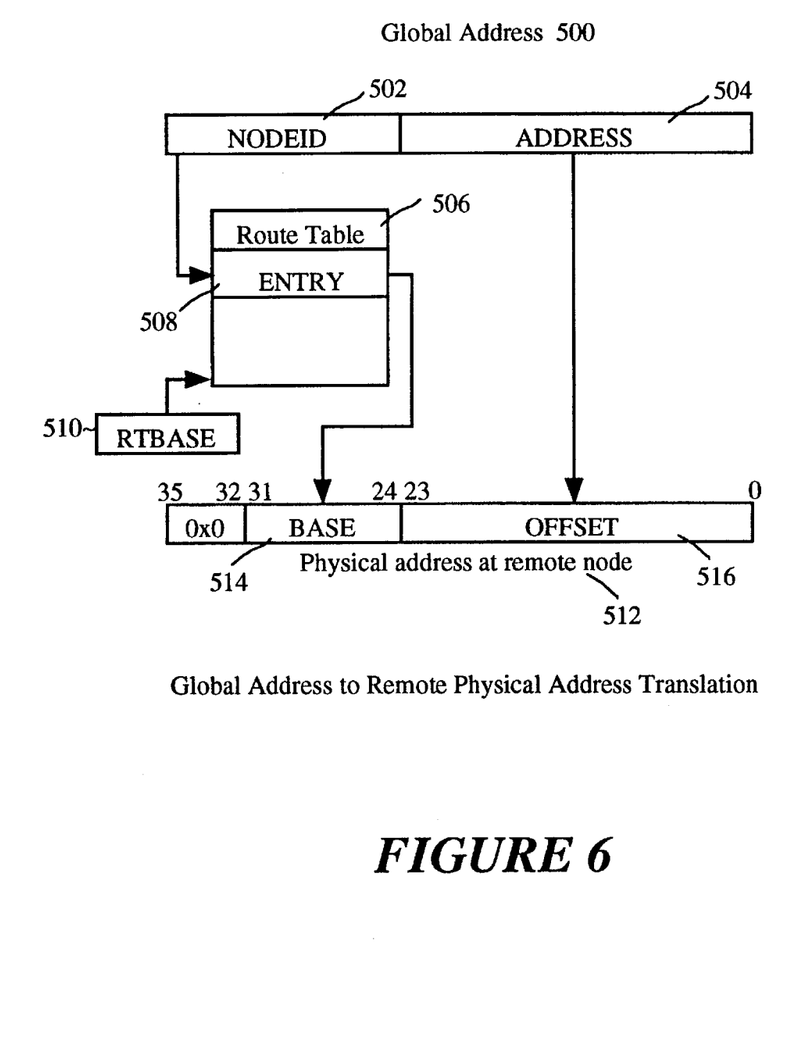
FIG. 6 illustrates an atomic operation on memory.

FIG. 6 illustrates the translation from a global address 500 to a remote physical address 512. When a remote memory access request is observed on the processor bus (i.e., an address greater than $2^{32}$), the NIC uses a route table 506, disposed in local memory to translate the global address 500 to a route and a physical address 512 to be used at the remote node.

Before the NIC can send the remote memory access request to the remote node, the NIC must first obtain route information. The NIC reads the contents of RTBASE register 510 to determine where the route table is located in local physical memory. The NIC uses the NODEID portion 502 of the global address 506 as an offset or index into the route table. Thus, the NIC reads the appropriate entry 508 in the route table 506 by using the global address 506 and the contents of RTBASE register 510.

Each entry in this route table contains both the outbound route, the return route, and an 8-bit remote memory address offset. The 8-bit remote memory offset of the entry 508 maps directly into the base portion 514 of the physical address at the remote node 512. The address portion 504 of the global address 500 maps directly into the offset portion 516 of the physical address at the remote node 512. The NIC performs a single memory read operation on memory local memory to retrieve this route table information. The size and format of the route table will be discussed in detail with reference to Tables 1 and 2.

Route table entries where the destination node is the same as the source node are supported in this system. All remote memory access requests are treated in the same fashion, irrespective of the value of the route. For example a, remote memory access request where the requesting node and the destination node are identical will incur the same network and packetization latencies as a remote access request, where the requesting node and the destination node are different. Also, in this system, the same memory location may be addressed by two addresses: a local address and a global address.

TABLE 1

Format of a Route Table Entry

| 63 | 56 55 | 32 |
|---|---|---|
| Remote Base [31:24] | | Return Route |

| 31 | 24 23 | 0 |
|---|---|---|
| | | Destination Route |

TABLE 2

Route Table Base (RTBASE) Register

| 31 | 15 14 | 0 |
|---|---|---|
| Table Base | | Reserved |

ROUTE TABLE

The NIC uses a route table that is located in memory to perform the physical address to route address translation. Each entry in the route table is 64 bits wide and contains both a destination route, return route, and an 8-bit address base to be used at the remote node. Table 1 shows the format of each entry in the Route Table. The destination and return routes are the 24-bit routes as required by the routers in the network. [can these be used for NIC rings?]

Each entry in the route table is 64-bits. The route table is contiguous in memory and must be aligned on a 32K byte boundary. The NIC uses the contents of the Route Table Base (RTBASE) register as a base, and PA[35:24] (PA is physical address) as an offset to obtain the address of the appropriate route table entry. Table 2 shows the format of the RTBASE register.

ATOMIC OPERATIONS

Shared memory programs employ a variety of mechanisms for synchronization such as barriers, locks, and mutually exclusive access to critical sections. Because of their shared nature, updates to synchronization variables must be atomic. In other words, Read-modify-Write operations on synchronization variables must complete without interruption. Neither the cache-based locks nor the bus-based locks provided by the processor can be used for atomic operations on remote data. (1) Cache-based locks are not feasible because RMA is non-coherent. (2) Bus-based locks are not feasible because of performance penalty and the possibility of deadlock. Therefore, the NIC provides hardware support for atomic operations on remote data called Atomic Operation Memory (AOM).

TABLE 3

Format of AOM Registers

| 31 | 12 11 | 0 |
|---|---|---|
| AOMBase | | Reserved |

| 31 | 12 11 10 | 0 |
|---|---|---|
| AOMLimit | V | Reserved |

The NIC provides support for atomic operations on remote data through the AOM memory.

Atomic Omeration Memory (AOM)

AOM is a region of memory reserved for atomic Read-modify-Write operations of lock variables. Referring to FIG. 5 on each node, a region of local memory 414 may be set aside for AOM. This region is defined by the AOM base (AOMBase) and limit (AOMLimit) registers on the NIC. Table 3 illustrates the format of the AOMBase and AOMLimit registers. The AOM region 414 must be backed by local physical memory on the node and aligned on a 4K byte boundary. When the NIC receives a request from the network and the address lies within the AOM range, a simple Read & clear operation is performed atomically (using bus lock operations provided by the protocol of the processor bus).

FIG. 5 illustrates the role of global and local memory in an access to AOM.

Lock Acquisition Using AOM

Lock acquisition is performed by a Read operation performed by the processor (the address must be in uncacheable memory). The Read is identified as a global access and sent to the remote node to be completed. When the NIC receives a request from the network for a Read access, it determines if the Read address falls within the local range for AOM memory. If so, the NIC performs the Read access as instructed by the transaction, but with the bus lock bit asserted (this is supported by the processor bus protocol). The NIC returns the value Read from memory to the requesting node and immediately Writes "0" to the location. The NIC releases the bus lock on the Write operation. A non-zero value returned to the requesting node indicates the lock was successfully obtained. A "0" indicates that the lock is in use.

The NIC supports byte, word, and double word (one to eight bytes) lock variables. An AOM byte Read will cause the specific byte to be cleared, and likewise, a double word Read will clear the entire double word.

Lock Release

To release (or initialize) the lock variable, the user performs a Write of a non-zero value to the location.

Local vs. Remote AOM

The NIC 58 supports the routing of a request to the same node that originated the request (the request can be sent to the network and returned to the same node). As a result, data on a node can have two addresses; a global address, and a local address. The global address is serviced by the NIC (using the remote memory access path), and the local address is serviced by the local memory controller on the node. To use the AOM feature, software does not have to determine if the data is local or remote. As long as the processor performs a Read of a global address, the read_ &_clear operation will be performed on a physical address by the NIC.

SYSTEM REQUIREMENTS

The following described the RMA system requirements:

Split-transaction processor bus for deadlock avoidance.

Local physical memory must be located between physical address 0 and $2^{31}$.

Bus-based locks for local atomic operations must be supported by the protocol of the processor bus.

RMA requires one lane in the network for requests and one lane for responses. For deadlock avoidance, the system must guarantee that responses will always be removed from the network.

It will be appreciated that various modifications and alterations might be made by those skilled in the art without departing from the spirit and scope of the present invention. The invention should, therefore, be measured in terms of the claims which follow.

What is claimed is:

1. In a massively parallel data processing system having a plurality of nodes, with the nodes connected together through a network, wherein each node includes a processor; a memory for storing data; a processor bus coupling the processor to the memory for facilitating communication and data transfer to and from the processor and the memory; and a remote memory access controller, coupled to the bus, for detecting and processing remote memory access requests, said remote memory access controller comprising:

(a) a remote memory access request mapping module coupled to the processor bus for detecting a remote memory access request;

(b) a processor bus interface coupled to the processor bus and the remote memory access request mapping module for providing an interface between the processor and the remote memory access controller;

(c) a packet generator coupled to the processor bus interface, said processor bus interface receiving a remote memory request, accessing a route table for network route information, and generating a request packet having said network route information, said request packet suitable for transmission on the network;

(d) a packet decoder coupled to the processor bus interface for decoding response packets and request packets into a corresponding response and request;

(e) a bus master module coupled to the packet decoder and to the packet generator, for implementing a remote memory access protocol; and (f) a network protocol interface coupled to the network, said network protocol interface having at least two lanes, said network protocol interface receiving request packets from the network and sending response packets to the network and detecting network errors in the response and request packets, said network protocol interface adapted to handle multiple outstanding requests and responses.

2. The remote memory access controller of claim 1, wherein a bus master module coupled to the packet decoder and to the packet generator for implementing a remote memory access protocol further includes a plurality of registers and a remote memory access state machine.

3. The remote memory access controller of claim 1 further comprising a plurality of buffers coupled to the network protocol interface, the packet generator and the packet decoder for queuing request packets and response packets.

4. The remote memory access controller of claim 1, wherein the bus master module further comprises: at least one memory fence support register corresponding to each processor, for tracking the number of remote memory accesses outstanding for an application running on the processor;

wherein the register is accessible to a system programmer, and the register is adapted to support memory fences.

5. The remote memory access controller of claim 1, wherein the bus master module further comprises a plurality of atomic memory support registers, said registers including a first atomic register holding a base address that represents a start address of an atomic region; and a second atomic register holding a limit address that represents an end address of the atomic region;

wherein the first atomic register and the second atomic register are accessible to a system programmer and may be used to support atomic memory operations.

6. The remote memory access controller of claim 1, wherein the bus master module further comprises at least one register accessible to a system programmer for error recording and notification.

7. The remote memory access controller of claim 1, wherein the bus master module further includes at least one register accessible to a system programmer for providing software reset and control in remote memory access transactions.

8. The remote memory access controller of claim 1, wherein the processor bus interface and the bus master module are adapted to handle split transactions on the processor bus.

9. The remote memory access controller of claim 8, wherein the processor bus is compliant to the P6 bus specification.

10. A method of mapping a global address to a corresponding physical address at a remote node comprising the steps of:

a) defining a route table at a local node including a number of entries in local physical memory, said route table pointed to by a route-base register holding a start address of the route table;
    wherein a node-field in the global address is an offset for determining the location in the route table from the address in the route-base register;

b) forming a base field in the physical address by an entry identified by the node-field;

c) mapping the address field of the global address directly to the offset field of the physical address; and d) mapping the entry directly into the base field of the physical address.

11. The method of claim 10, further comprising the step of partitioning the total address space into a global address space and a local address space;

wherein the local memory address space begins at a first predetermined physical address in memory and extends to a second predetermined address in memory;

wherein the global addresses begins at a third predetermined address in the memory and extends to a fourth predetermined address;

wherein the local and global address spaces do not overlap;

wherein at least one local address points to a local physical memory location;

wherein a global address points to a remote physical memory location in a remote node, and the global address may point to a physical memory location in the local node in an atomic memory operation; and wherein each global address must be mapped into a local address by using a route table in the local node to access a physical memory on a remote node.

12. The method of claim 11 further comprising the step of defining an atomic address space beginning at a fifth predetermined physical address and extending to a sixth predetermined physical address;

wherein if an address is within the atomic address space, then a read command to this specified address in atomic memory is performed and a clear operation is automatically performed on this memory location.

* * * * *

UNITED STATES PATENT AND TRADEMARK OFFICE
CERTIFICATE OF CORRECTION

PATENT NO. : 5,613,071
DATED : March 18, 1997
INVENTOR(S) : Rankin et al.

It is certified that error appears in the above-identified patent and that said Letters Patent is hereby corrected as shown below:

In column 1 at line 54 delete "programing" and insert --programming--

In column 8 at line 10 delete "he" and insert --the--

In column 14 at line 14 delete "Omeration" and insert --Operation--

Signed and Sealed this

Fifteenth Day of July, 1997

*Attest:*

BRUCE LEHMAN

*Attesting Officer*        Commissioner of Patents and Trademarks